United States Patent

Suzuki et al.

Patent Number: 5,297,472
Date of Patent: Mar. 29, 1994

[54] BEVERAGE EXTRACTION DEVICE

[75] Inventors: Mitsuo Suzuki; Hisashi Karasawa; Michio Seshimo, all of Gunma, Japan

[73] Assignee: VKI Technologies, Inc., Canada

[21] Appl. No.: 953,005

[22] Filed: Sep. 29, 1992

[51] Int. Cl.⁵ .................................. A47J 31/32
[52] U.S. Cl. .............................. 99/289 T; 99/304
[58] Field of Search ............... 99/289 T, 290, 283, 99/287, 292, 299, 302 R, 323.1, 304

[56] References Cited

U.S. PATENT DOCUMENTS

| | | | |
|---|---|---|---|
| 3,084,613 | 4/1963 | Maxson | 99/299 |
| 3,478,670 | 11/1969 | Fuqua | 99/283 |
| 4,581,239 | 4/1986 | Woolman et al. | 99/283 |
| 4,791,859 | 12/1988 | King | 99/289 T |
| 4,823,685 | 4/1989 | Boumans et al. | 99/287 |
| 4,833,979 | 5/1989 | Garulli et al. | 99/287 |
| 4,967,647 | 11/1990 | King | 99/287 |
| 4,998,462 | 3/1991 | Sekiguchi | 99/289 T |
| 5,083,504 | 1/1992 | Koga et al. | 99/302 R |
| 5,154,111 | 10/1992 | Luciano | 99/302 R |

Primary Examiner—Harvey C. Hornsby
Assistant Examiner—James F. Hook
Attorney, Agent, or Firm—Hill, Steadman & Simpson

[57] ABSTRACT

A beverage extraction machine in which powdered material such as coffee is mixed with hot water in an extraction chamber which is mounted over a beverage receiver with a filter mounted between them. High pressure air is supplied into the beverage receiver and passes up through the filter to agitate the hot water and powdered material in the extraction chamber. Then air is sucked from the beverage receiver and drums the brewed coffee from the extraction chamber through the filter into the beverage receiver where it is discharged to a cup. A pressure sensor can be used to control the application of the high and low pressure air.

2 Claims, 2 Drawing Sheets

BEVERAGE EXTRACTION DEVICE

BACKGROUND OF THE INVENTION

1. Field of the Invention

The present invention relates to a beverage extraction device which can be provided in the main body portion of a vending machine or the like.

2. Description of Related Art

In this type of the beverage extraction device, powder material such as coffee is mixed with hot water and decocted. Then, the decoction liquid is passed through a filter, and extracted. The specific structure is disclosed in Published Unexamined Japanese Patent Application No. 61-31110 and Published Unexamined Japanese Patent Application No. 61-31108. Published Unexamined Japanese Patent Application No. 61-31110 discloses a structure in which an extraction chamber is provided on the upper surface of an extraction receiver so as to sandwich a filter, and powdered material of coffee and hot water are supplied to the extraction chamber. In this state, high pressure air is supplied through the filter from the under side of the filter into the extraction chamber, so that the powdered material and hot water are mixed in the extraction chamber by the high pressure air and thus decoction liquid is generated. Thereafter a piston is moved down to the lower portion of the extraction chamber from the upper portion thereof so as to extract decoction liquid, so that decoction liquid is passed by pressure through the filter and is extracted at the under side of the filter.

Moreover, Published Unexamined Japanese Patent Application No. 61-31108 discloses a structure in which a material inlet is formed in the upper portion of an extraction chamber, and a valve mechanism for opening and closing the material inlet is provided. Powdered material and hot water are supplied into the extraction chamber through the material inlet and high pressure air is supplied through a filter from the underside of the filter into the extraction chamber, so that the powdered material and hot water are mixed in the extraction chamber by the high pressure air and a decoction liquid is generated. Thereafter the material inlet is closed by the valve mechanism, so that the inside of the extraction chamber is airtight, and high pressure air is sent into the upper portion of the extraction chamber, so that decoction liquid is pressurized by the high pressure air and decoction liquid passes through the filter by the air pressure, and is extracted to the lower portion beneath the filter.

SUMMARY OF THE INVENTION

However, in the device disclosed in Published Unexamined Japanese Patent Application No. 61-31110, because a piston and its driving device are required and the structure is complicated and the manufacturing cost is high. Also, in the device disclosed in Published Unexamined Japanese Patent Application No. 61-31108, there are required a valve mechanism and its driving device and the structure is complicated and the manufacturing cost is high. Moreover, in supplying powdered material into the extraction chamber through the material inlet, the powdered material adheres to the valve mechanism. Due to this, particularly, in a case where the same extraction chamber is used in common to extract the decoction liquid using different types of powdered materials, the powdered materials adhere to the valve mechanism and it must be taken out and cleaned every time the extraction chamber is used in order to prevent contamination from the powdered material previously used. Such cleaning is considerably complicated, time consuming and expensive.

So as to solve these problems, the present invention has been made, and it is an object of the present invention to provide a beverage extraction device wherein the structure is simple, and the powdered material does not adhere to the device and is not left thereon.

In order to achieve the above object, the present invention provides a beverage extraction comprising a beverage receiver capable of being closed airtight, and an extraction chamber is provided on the beverage receiver so as to sandwich a filter therebetween. A material supply means supplies powdered material into the extraction chamber and a hot water supply means supplies hot water into the extraction chamber. A high air pressure means supplies pressurized air into the beverage receiver and introduces air into the extraction chamber through said filter, thus agitating the powdered material and hot water. Air sucking means are provided for sucking air from the beverage receiver, and for extracting decoction liquid from the extraction chamber into the beverage receiver through the filter by negative pressure.

When extracting beverage, a predetermined amount of powdered material and hot water are supplied to the extraction chamber, and under this condition, air is supplied under pressure into the beverage receiver by the high air pressure sending means. Air passes through the filter, and is introduced into the extraction chamber in the form of foam. The powdered material and hot water in the extraction chamber are agitated by the air, and thereby decoction liquid is efficiently generated.

Thereafter, air in the beverage receiver is sucked by the air sucking means. The inside of the beverage receiver then has a negative pressure and the decoction liquid in the extraction chamber passes through the filter, and is extracted into the beverage receiver.

Therefore, it is unnecessary to provide a piston for pressurizing the decoction liquid or a valve mechanism for airtight closing the extraction chamber after supplying the powdered material and hot water thereto.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DETAILED DESCRIPTION OF THE PREFERRED EMBODIMENTS

The embodiments of the present invention will be explained with reference to the drawings.

Figure 1:
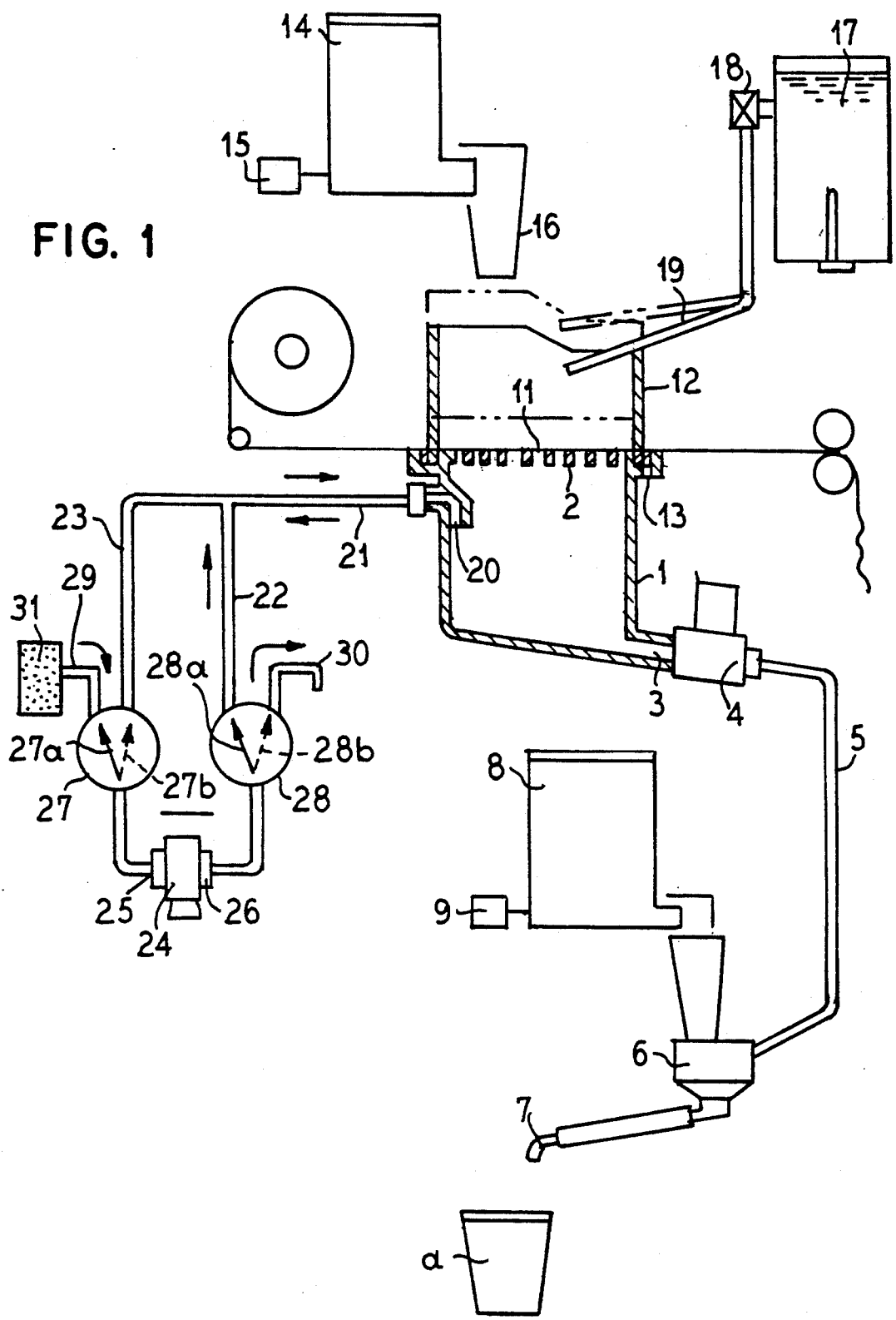
FIG. 1 is a structural view of a beverage extraction device according to a first embodiment of the present invention.

FIG. 1 shows a first embodiment. A beverage receiver 1 has a constant volume. The beverage receiver 1 has a latticed plate 2 in its upper surface and an outlet 3 in its lower end portion, valve 4 which can be opened or closed is mounted in the outlet 3. A guide hose 5 extends from the valve 4. A mixing bowl 6 is connected to the output end of the guide hose 5. A nozzle 7 extends from the mixing bowl 6. A canister 8 for holding additives is provided on the upper portion of the mixing bowl 6, and additives such as milk and sugar in the canister 8 are supplied to the mixing bowl 6 by a drive motor 9. A tape-like filter 11, which is drawn from a roller 10, is movably arranged on the upper surface of the plate 2. The interior of the beverage receiver 1 is maintained airtight by the filter 11. On top of the beverage receiver 1, there is provided a cylindrical extraction chamber 12 on the opposite side of the filter 11 than to the beverage receiver 1. The extraction chamber 12 is mounted so as to be movable up and down. The extraction chamber 12 is constructed so as to be joined in an airtight manner to the beverage receiver 1 by a seal 13 in a normal condition.

A material canister 14 serves as a means for supplying material and is mounted on the upper portion of the extraction chamber 12. For example, powdered material such as coffee is contained in the canister 14, and the powdered material is supplied into the extraction chamber 12 from the canister 14 through a chute 16 by the drive motor 15. A water boiling tank 17 serves as a means for supplying hot water and is mounted on an upper slanted portion of the extracting chamber 12. A hot water hose 19 is guided out from the water boiling tank 17 through an electromagnetic valve 18. Hot water in the water boiling tank 17 is supplied into the extraction chamber 12 through the hose 19 by opening the electromagnetic valve 18.

For the beverage receiver 1, there are provided a high pressure air means for sending air into the interior of the receiver 1 and air sucking means for sucking air from the interior of the receiver 1. One example of the structure of these means will be explained. A ventilation port 20 is provided in the upper portion of the side surface of the beverage receiver 1, and a vent pipe 21 is connected to the ventilation port 20. The vent pipe 21 branches into an inflow pipe 22 and an outflow pipe 23 at the opposite end from the ventilation port 20. Reference number 24 is an air pump. The air pump 24 has an intake port 25 and a discharge port 26, and three-way switching valves 27 and 28 are respectively connected to the intake port 25 and the discharge port 26. The three-way switching valves 27 and 28 have first passages 27a and 28a and second passages 27a and 28b which communicate with the air pump 24. The first passages 27a and 28a and second passages 27b and 28b are selectively opened and closed. In one three-way switching valve 27, an intake pipe 29 is connected to the first passage 27a, and the outflow pipe 23 of the vent pipe 21 is connected to the second passage 27b. In the other three-way switching valve 28, the outflow pipe 22 of the vent pipe 21 is connected to the first passage 28a, and a discharge pipe 30 is connected to the second passage 28b. An air filter 31 is provided at the end portion of the intake pipe 29.

Operation of the device is as follows.

At the time of extracting beverage, the beverage extraction chamber 12 is joined to the beverage receiver 1, and the outlet 3 is closed by the valve 4, and the first passages 27a and 28a of the three-way switching valves 27 and 28 are opened. Under this condition, a predetermined amount of powdered material is supplied to the extraction chamber 12 from the canister 14, and a predetermined amount of hot water is supplied to the extraction chamber 12 from the water boiling tank 17. Thereafter, the air pump 24 is operated, and air is sucked by the intake port 25 of the air pump 24 from the air filter 31 through the intake pipe 29, and the first passage 27a of the three-way switching valve 27. Air is sequentially sent to the beverage receiver 1 from the discharge port 26 through the first passage 28a, the outflow pipe 22, the vent pipe 21, and the ventilation port 20. During this operation, pressure in the beverage receiver 1 increases, so that air in the receiver 1 enters into the extraction chamber 12 in the form of foam through the filter 11. Thereby, powdered material in the extraction chamber 12 and the hot water are effectively air-agitated, and the powdered material is efficiently decocted with hot water.

Then the first passages 27a and 28a of the three-way switching valves 27 and 28 are operated so they are closed, and the second passages 27b and 28b are opened. During this operation, air in the beverage receiver 1 is sucked into the intake port 25 of the air pump 24 from the ventilation port 20 through the vent pipe 21, the outflow pipe 23, and the second passage 27b of the three-way switching valve 27. Also, air is discharged to the outside from the discharge port 26 through the second passage 28b of the three-way switching valve 28, and the discharge pipe 30. During this operation, pressure in the beverage receiver 1 decreases and becomes a negative pressure, and the decoction liquid in the extraction chamber 12 passes through the filter 11, and is sequentially extracted into the beverage receiver 1.

After the extraction is finished and the predetermined amount of decoction liquid has collected in the beverage receiver 1, the valve 4 is opened, and the first passages 27a and 28a of the three-way switching valves 27 and 28 are opened and the second passages 27b and 28b are closed. During this operation, pressurized air is sent into the beverage receiver 1, so that the decoction liquid in the beverage receiver 1 is forcefully discharged into the mixing bowl 6 from the outlet 3 through the guide hose 5 by air pressure and gravity. Then, additives such as milk and sugar from the canister 8 are added into the mixing bowl 6 from the canister 8, and thereafter the decoction liquid is ejected into from nozzle 7 a cup a, which is set in a cup receptacle of a vending machine. Since the decoction liquid in the beverage receiver 1 is forcefully discharged from the beverage receiver 1, a mixture of the additives is effectively performed, and the decoction liquid is rapidly ejected in to the cup a.

After the discharge of the decoction liquid has been finished, the operation of the air pump 24 is stopped. The outlet 3 is closed by the valve 4, and the extraction chamber 12 is moved up as shown by a chain line. Then the filter 11 moves to the right relative to the drawing, and the grounds of the powdered material which are left on the filter 11 are removed therefrom, and a new portion of the filter 11 is arranged on the plate 2. Then, the extraction chamber 12 is moved down and joined to the beverage receiver 1, and the machine is ready for the next extraction.

Substantially all of the decoction liquid in the extraction chamber 12 is extracted by the negative pressure in the beverage receiver 1, and air passes through the grounds of the powdered material and is gradually introduced into the beverage receiver 1. Then, the flow resistance of the air passing through the grounds of the powdered material is gradually reduced and the inflow of air into the beverage receiver 1 is increased, and the pressure in the inside of the beverage receiver 1 varies from a negative pressure to a pressure which is close to normal on atmospheric pressure.

Figure 2:
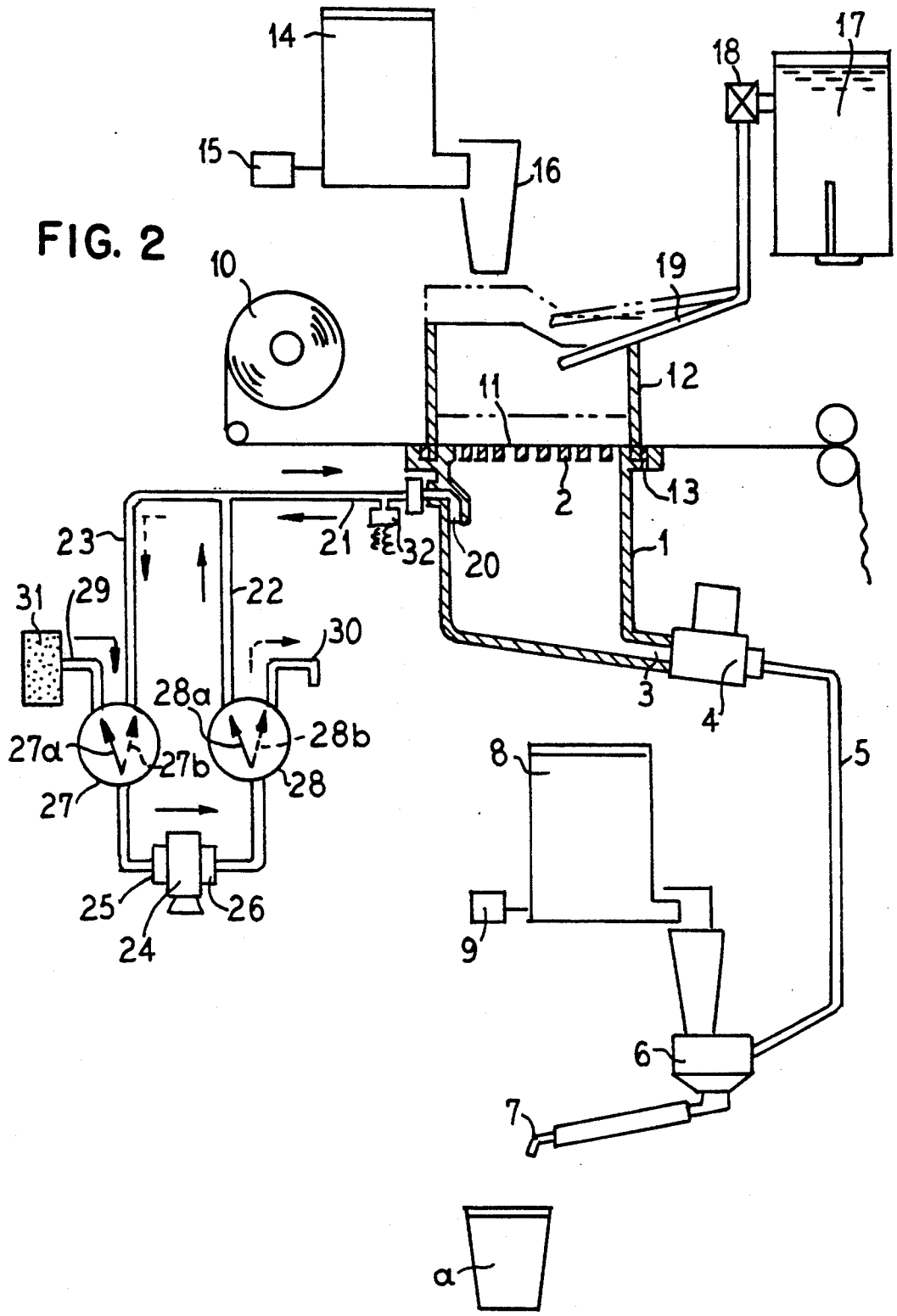
FIG. 2 is a structural view of a beverage extraction device according to a second embodiment of the present invention.

Therefore, as shown in the second embodiment of FIG. 2, it is possible to provide a structure in which a pressure sensor 32 is provided in the vent pipe 21 so that the pressure variations are detected by the pressure sensor 32 and the switching of the three-way switching valves 27 and 28 can be performed based on the result of such pressure detection, and air for discharging the decoction liquid can be sent to the beverage receiver 1 from the air pump 24. According to this structure, the transition from the extraction of the decoction liquid to the discharge thereof can be smoothly performed, and the decoction liquid can produced much faster and supplied into the cup a.

As described above, according to the present invention, the air-agitation of the powdered material and hot water and the extraction of the decoction liquid can be performed simply by switching pressurized air to the beverage receiver and by the suction of air without the use of a piston for pressurizing the decoction liquid and a valve mechanism for airtight closing the extraction chamber after supplying powder material and hot water thereto. Therefore, the structure is simple, and the manufacturing cost is low. Also unlike conventional devices in the invention powdered material does not adhere to the valve mechanism and is not left thereon. Particularly, cleaning the device is not required. Moreover, even in a case where the decoction liquid is made from different types of powdered material and extracted by the same extraction device, there is not left the smell or contamination of the powdered material previously used.

Although the invention has been described with respect to preferred embodiments, it is not to be so limited as changes and modifications can be made which are within the full intended scope of the invention as defined by the appended claims.

We claim as our invention:

1. A beverage machine comprising, an airtight beverage receiver chamber;

a filter connected across the top of said beverage receiver chamber;

an extraction chamber attached to said beverage receiver chamber with said filter therebetween;

means for supplying powdered material into said extraction chamber;

means for supplying hot water into said extraction chamber;

an outlet beverage valve connected to said beverage receiver chamber;

an air pump with an inlet and an outlet, a first two-way valve connected to the inlet of said pump, a second two-way valve connected to the outlet of said pump, an air intake pipe (29) connected to said first valve, a first outlet pipe (30) connected to said second valve, an inflow pipe (22) connected to said second valve, a vent pipe (21) connected to said inflow pipe (22) and to said beverage receiver chamber, a second outflow pipe (23) connected to said first valve and to said vent pipe (21), and said first and second valve moveable to first positions when said outlet beverage valve is closed so that high pressure air passes through said air intake pipe (29), said first valve (27) through said pump, said second valve, said inflow pipe (22) and said vent pipe (21) so as to force air up through said filter so as to agitate said powdered material and hot water, and said first and second valves moveable to second positions when said outlet beverage valve is closed so that low pressure is produced in said beverage receiver chamber and air passes from said beverage receiver chamber through said vent pipe (21), said second outflow pipe (23), said first valve, said second valve (28) and said first outlet pipe (30) so as to draw said powdered material and hot water through said filter from said extraction chamber moving it into said beverage receiver chamber, and said first and second valves moveable to said first positions when said outlet beverage valve is open so as to apply high pressure air to said beverage receiver chamber so as to discharge said detection fluid through said outlet beverage valve.

2. A beverage machine according to claim 1 including a pressure sensor mounted so as to detect the pressure within said beverage receiver chamber and connected to said two valves to control them to supply air into and from said beverage receiver chamber.

* * * * *